(12) United States Patent
Chin et al.

(10) Patent No.: US 9,087,246 B1
(45) Date of Patent: Jul. 21, 2015

(54) RFID-TO-BLUETOOTH SELECTIVE ADAPTER

(71) Applicant: POLARIS TECH GLOBAL LIMITED, Victoria, SC (US)

(72) Inventors: Ting-Yueh Chin, Taichung (TW); Su-Teng Kuo, New Taipei (TW)

( * ) Notice: Subject to any disclaimer, the term of this patent is extended or adjusted under 35 U.S.C. 154(b) by 0 days.

(21) Appl. No.: 14/623,464

(22) Filed: Feb. 16, 2015

(51) Int. Cl.
*H04Q 5/22* (2006.01)
*G06K 7/10* (2006.01)
*H04W 4/00* (2009.01)

(52) U.S. Cl.
CPC ........... *G06K 7/10297* (2013.01); *H04W 4/008* (2013.01)

(58) Field of Classification Search
CPC ............ G06K 7/10366; G06K 7/0008; G06K 7/10009; G06K 9/07749; G06K 7/10297; G06K 7/1038
USPC .............. 340/10.1, 10.34, 10.5, 572.1, 572.4; 455/41.1, 41.2
See application file for complete search history.

(56) References Cited

U.S. PATENT DOCUMENTS

| | | | | |
|---|---|---|---|---|
| 8,880,055 | B1* | 11/2014 | Clement et al. | 455/420 |
| 2007/0202807 | A1* | 8/2007 | Kim | 455/41.2 |
| 2012/0007712 | A1* | 1/2012 | Tung | 340/5.72 |

* cited by examiner

*Primary Examiner* — George Bugg
*Assistant Examiner* — Sharmin Akhter
(74) *Attorney, Agent, or Firm* — Ding Yu Tan (57) ABSTRACT

A RFID-to-Bluetooth selective adapter which includes a customized RFID transponder with an on/off switch, a RFID sensor coil, and a Bluetooth module with an EEPROM memory is disclosed. The RFID-to-Bluetooth selective adapter can be attached to a RFID doorlock to operate in both RFID mode and Bluetooth modes without interference therebetween, so as to use by RFID tags or smartphones, respectively. The RFID reader equipped device can be a RFID smart doorlock; a door is configured with the RFID smart doorlock and the RFID-to-Bluetooth selective adapter is mounted thereon, and the door can be opened and closed using the APP by the authorized user in real-time with or without internet connection. The RFID-to-Bluetooth selective adapter functions as a bridge between the RFID reader equipped device and smartphone operating under Bluetooth smart. In addition, the RFID-to-Bluetooth selective adapter possesses several security upgrade options.

16 Claims, 7 Drawing Sheets

RFID-TO-BLUETOOTH SELECTIVE ADAPTER

FIELD OF THE INVENTION

The present invention generally relates to a RFID-to-Bluetooth adapter device and, more particularly, to a RFID-to-Bluetooth selective adapter configured for use in combination with a RFID reader equipped device.

BACKGROUND OF THE INVENTION

In today's door access control systems, there are many places that have adopted RFID doorlocks for improved door access control functions. According to a survey of a physical access control market research, more than 70% of the end-users and 80% of industry respondents believe that in the next 3 to 5 years, hope to use mobile phones, key cards, smart label or alternative devices to replace conventional locks and keys. The survey is further proof that the market will usher in a major smart lock revolution. Lock Industry experts have said that the current number of locks sold in China is about 2.2 billion per year or more. Looking at just the fingerprint recognition technology application statistics alone, for example, it is estimated that including financial, military, office space, luxury residential, including commercial and residential market applications, there is about 500 million units per year in market demand for the fingerprint recognition access control system, according to recent web article from www.chinairr.org published on 2014 Sep. 30 (China Industry Research Reports).

However, the conventional smart door locks are typically in the form of RFID doorlocks or Bluetooth activated smart doorlocks. If someone already has a RFID doorlock, it would not be possible to easily upgrade the existing RFID doorlock to that of a Bluetooth smart doorlock. In other words, the existing RFID doorlock has to be completed removed, while replaced by a new Bluetooth smart doorlock installed on the door (for replacing the previous RFID doorlock altogether). Meanwhile, after installation of the new Bluetooth smart doorlock, the previous RFID tags being used as keys for opening the previous RFID doorlock can no longer work on the new Bluetooth smart doorlock, so that the new Bluetooth smart doorlock must be limited to be activated only by Bluetooth capable mobile devices.

Therefore, there is a need in providing a more integrated door access control solution that would be flexible enough to provide both RFID access control as well as Bluetooth access control, thereby improving the overall door access control needs for users.

SUMMARY OF THE INVENTION

The present invention provides a RFID-to-Bluetooth selective adapter according to an embodiment of present invention for upgrading a conventional RFID doorlock to become capable of operating in two modes simultaneously, namely operating in RFID mode or Bluetooth mode, for allowing entry access by using conventional RFID key tags or Bluetooth equipped smartphones and mobile wearable electronic devices, respectively.

In addition, the present invention discloses a RFID-to-Bluetooth selective adapter which functions as a bridge or interface device between a RFID reader equipped device and wireless mobile electronic devices operating under Bluetooth or Bluetooth smart capability.

The RFID-to-Bluetooth selective adapter of present invention can allow RFID reader equipped devices that are capable of only being activated by RFID tags to be adapted for usage under Bluetooth wireless communication protocol by Bluetooth equipped wireless mobile electronic devices.

The RFID-to-Bluetooth selective adapter of present invention does not negatively affect the original RFID doorlock functionalities between the RFID reader equipped device and the conventional RFID tags, but at the same time, allows for the added or extended capability of operating as well under Bluetooth environment.

The RFID-to-Bluetooth selective adapter of present invention can operate under a Bluetooth protocol version called Bluetooth Low Energy (BLE), which is a wireless personal area network technology configured for establishing device-to-device communications that can operating under very low power consumption. Meanwhile, the Bluetooth special interest group (SIG) refers to BLE as Bluetooth Smart. The communication data in the form of packets transmitted via BLE or Bluetooth smart protocol are encrypted thus ensuring high level of security.

The RFID-to-Bluetooth selective adapter of present invention can be adapted and configured for usage alongside existing RFID reader equipped devices, such as a RFID doorlock, for providing Bluetooth capability, so that smartphones and wearable wireless devices can also perform functions similar to that of the RFID tags (RFID transponder) for activating the RFID reader equipped devices, such as a RFID doorlock.

An application of the RFID-to-Bluetooth selective adapter of present invention would be for a RFID doorlock which is used as a part of a smart doorlock system.

Upon installation of the RFID-to-Bluetooth selective adapter on the sensor area of the RFID reader equipped device/i.e. the RFID doorlock, a smartphone (with BLE or Bluetooth smart capability) can be used to activate or lock/unlock the RFID doorlock.

By using the RFID-to-Bluetooth selective adapter of present invention, the conventional RFID doorlock functionalities can still be maintained, and at the same time, further providing added Bluetooth capability.

As a result, the RFID-to-Bluetooth selective adapter of present invention serves as an upgrade option to the conventional RFID doorlock, while having advantage such as being cost effective and easy to upgrade.

The RFID-to-Bluetooth selective adapter of present invention can be used, for example, in door or area access control situations, such as in private homes, day or monthly rental apartments, hotel rooms, and public space and resource usage management, community mail box, elevators, smart security cabinet, and is not limited to these applications only.

The user can set up and generate a certificate for authentication to the respective authenticated mobile phone upon authentication at a cloud based authentication server, thereby eliminating the need for having to retrieve or obtain any physical RFID key tag.

In embodiments of present invention, an APP configured to provide wireless Bluetooth low energy (BLE) smart door lock remote control operations, and to provide with an user account for the user on the smartphone to register the RFID-to-Bluetooth selective adapter as an authenticated trusted device in a cloud based authentication server.

In embodiments of present invention, the RFID-to-Bluetooth selective adapter is to be directly attached or disposed at close proximity to a sensor area of the RFID reader of the RFID reader equipped device.

In embodiments of present invention, the APP is used to set up access rights and permissions for the authenticated RFIDto-Bluetooth selective adapter, the cloud based authentication server can issue a digital certificate to the smartphone to be transmitted to the RFID-to-Bluetooth selective adapter, or the digital certificate can be issued instead through a third party trusted certificate authority. Thus, the APP is configured to provide wireless access management and control of the RFID reader equipped device using the RFID-to-Bluetooth selective adapter via BLE communications.

A RFID tag or a RFID card described herein can also be called a RFID transponder.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of the embodiments of this invention are presented herein for purpose of illustration and description only. It is not intended to be exhaustive or to be limited to the precise form disclosed.

Figure 1:
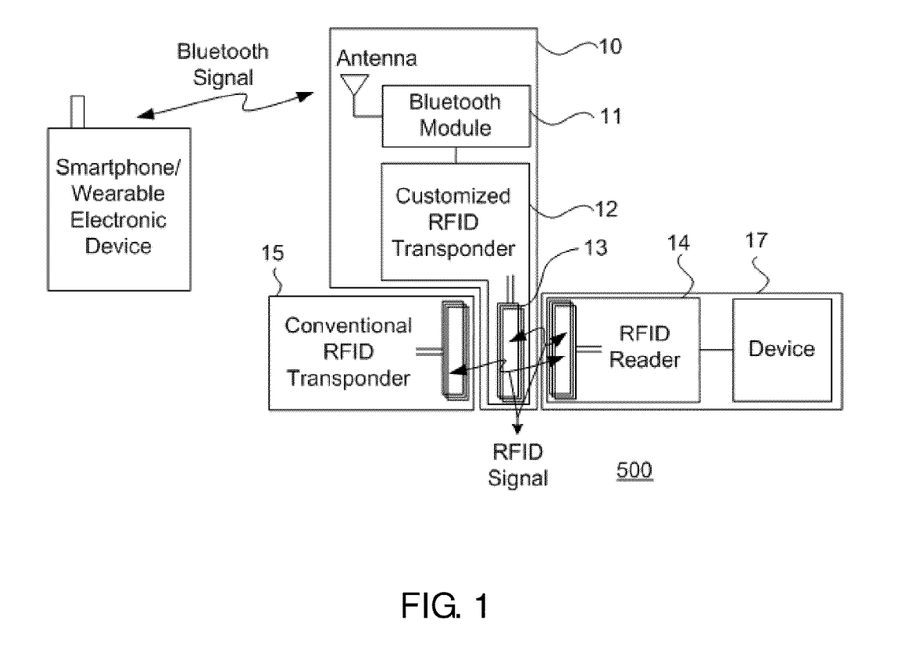
FIG. 1 shows a block diagram of a dual mode integrated access control system in accordance to a first embodiment of present invention.

As shown in FIG. 1, a dual mode (RFID and BLE) integrated access control system 500 is provided according to a first embodiment of present invention. The dual mode integrated access control system 500 includes a Bluetooth smart equipped wireless mobile electronic device, such as a smartphone or a wearable electronic device, a RFID-to-Bluetooth selective adapter 10, a conventional RFID tag 15, and a RFID reader equipped device 17. A RFID tag 15 or a RFID card described herein can also be called a RFID transponder. The RFID-to-Bluetooth selective adapter 10 is installed or attached onto the RFID reader equipped device 17. The RFID reader equipped device 17 has a RFID reader 14 therein. In this embodiment, the RFID reader equipped device 17 is a conventional RFID smart card door lock that is mounted to a door.

The RFID-to-Bluetooth selective adapter 10 includes a customized RFID transponder 12 and a Bluetooth module 11. The Bluetooth module 11 of the RFID-to-Bluetooth selective adapter 10 performs the function of controlling to activate and deactivate the customized RFID transponder 12, by directly controlling an on/off switch of the customized RFID transponder 12. This on/off switch can be installed at a RFID chip antenna terminal.

Figure 9:
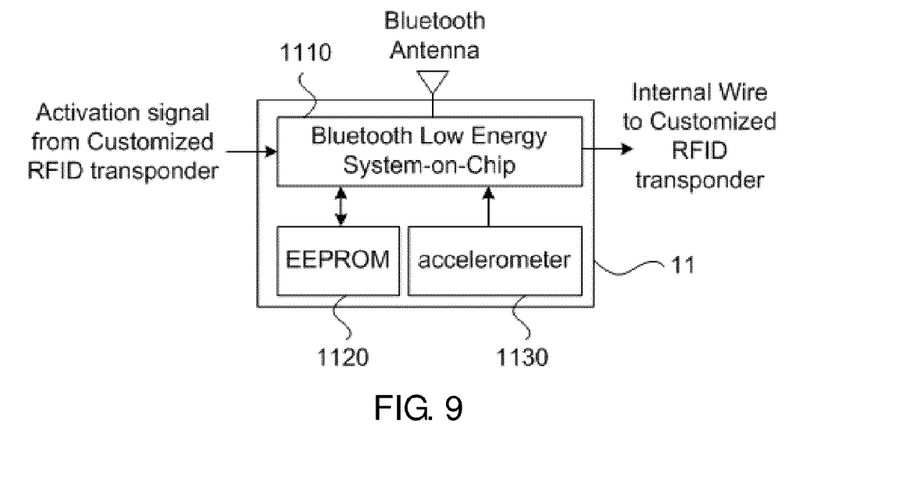
FIG. 9 shows a block diagram of a Bluetooth module of the first and second embodiment of present invention, respectively.

As shown in FIG. 9, the Bluetooth module 11 includes a Bluetooth Low Energy System-on-Chip (SoC) 1110, an EEPROM memory 1120, and an accelerometer 1130. The accelerometer 1130 can be one axis or three axis accelerometer.

Figure 8:
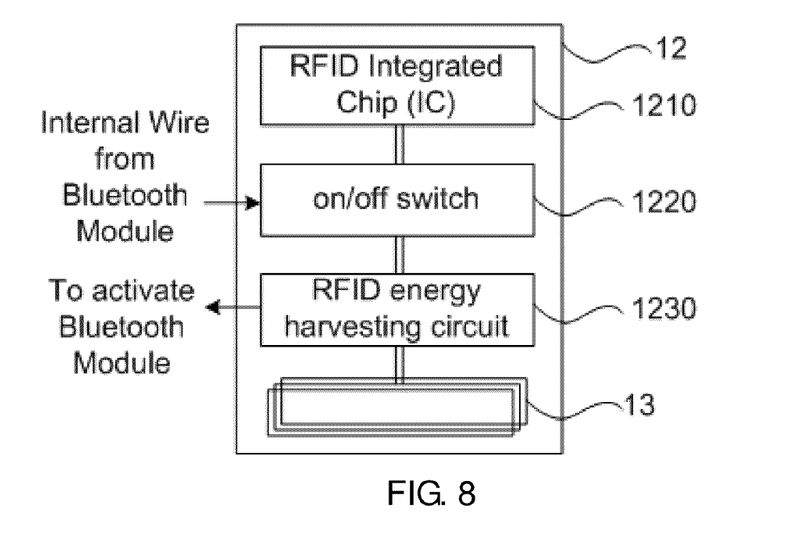
FIG. 8 shows a block diagram of a customized RFID transponder of the first and second embodiment of present invention, respectively.

As shown in FIG. 8, the customized RFID transponder 12 includes an RFID Integrated chip (IC) 1210, a RFID sensor coil 13, an on/off switch 1220, and a RFID energy harvesting circuit 1230. The customized RFID transponder 12 is different from the conventional RFID transponder 15 at least in the following: The customized RFID transponder 12 can be directly activated by the Bluetooth module 11 only, as well as, the customized RFID transponder 12 does not become activated based on any interrogating actions of any RFID reader 14 (which a conventional RFID transponder 15 would). In other words, any RFID reader cannot trigger any direct activation of the customized RFID transponder 12 of the RFID-to-Bluetooth selective adapter 10, because the initial activation trigger must come from the Bluetooth module 11 of the RFID-to-Bluetooth selective adapter 10 itself, and not from any outside devices. Thus, the customized RFID transponder 12 without being triggered into activation, would not interfere with other RFID tags/transponder when being used in tandem with the RFID reader equipped device 17. The customized RFID transponder 12 is directly activated only by the Bluetooth module 11 and not by the RFID reader 14 using an internal wire in the Bluetooth module 11 extending out to connect the on/off switch 1220 of the customized RFID transponder 12 for providing the activation. The RFID energy harvesting circuit 1230 detects whether the RFID reader 17 is in an interrogating state, and upon determining that the RFID reader 17 is in an interrogating state, the RFID energy harvesting circuit 1230 is to awaken the Bluetooth module 11 as to allow the smartphone and the Bluetooth module 11 engage in authentication, and upon authentication thereby activating the customized RFID transponder 12.

There are two methods for providing authentication security between the customized RFID transponder 12 and the RFID reader 14, in which a first method is to use the identification code of the RFID chip 1210 as the identifying number, while a second method adopts the registration key residing in the EEPROM memory 1120 of the bluetooth module 11 as the identifying number. The benefit of the first method of using the identification code of the RFID chip 1210 is that implementation can be achieved right at the current existing RFID chip. However, because the identification code of the RFID chip available in the marketplace are made in a permanent manner by one-time programming (OTP), thus would not allow for self-destruction protection technique upon the RFID chip being compromised when taken by criminals or thieves However, upon adoption of the second method which has the registration key residing in the EEPROM memory 1120 of the bluetooth module 11 used as the identifying number, and upon the RFID chip 1210 being compromised when taken by criminals or thieves, self-destruction protection technique can be performed to erase the registration key residing in the EEPROM memory 1120, so that security is enhanced by eliminating the risk of registration key compromise. As a result, the second method is a more secure option; however, the first method offers cost advantage.

The RFID-to-Bluetooth selective adapter 10 is installed directly or indirectly on or above a sensor area of the RFID reader equipped device 17, so as to facilitate the RFID Reader 14 in the RFID reader equipped device 17 to detect or interrogate the RFID-to-Bluetooth selective adapter 10 properly. Under typical normal operation, the customized RFID transponder 12 disposed inside the RFID-to-Bluetooth selective adapter 10 is not under an active operating mode (dormant mode), thereby allowing the RFID reader 14 of the RFID reader equipped device 17 to read and interrogate other RFID tags 15 without any perceived negative effect or detriments due to the presence of the RFID-to-Bluetooth selective adapter 10.

In the illustrated embodiment, the smartphone through BLE can perform authentication, and upon the smartphone successfully being authenticated, the RFID-to-Bluetooth selective adapter 10 can activate/turn on the customized RFID transponder 12 therein for 1-5 seconds to allow the RFID reader 14 to read a signal from the customized RFID transponder 12 of the RFID-to-Bluetooth selective adapter 10. Upon authentication by the RFID reader 14 of the RFID-to-Bluetooth selective adapter 10 using the customized RFID transponder 12 therein, the RFID reader equipped device 17 is then activated.

One advantage of the embodiment of present invention of using the RFID-to-Bluetooth selective adapter 10 is that when operating under a turned-off or deactivated state, a RFID sensor coil 13 of the RFID-to-Bluetooth selective adapter 10 is under an open circuit, the RFID reader equipped device 17 (or the RFID doorlock) can continue on reading and interrogating other conventional RFID tags 15 without any perceived negative effects or detriment when there is no smartphone with Bluetooth communication capability being at close proximity thereof.

Upon completion of authentication of the smartphone by the RFID-to-Bluetooth selective adapter 10, the access rights for the authenticated user is provided, and at this time, the customized RFID transponder 12 and the on/off switch 1220 is activated/turned on, so as to allow data to be transmitted and read by the RFID reader 14 of the RFID reader equipped device 17.

Figure 2:
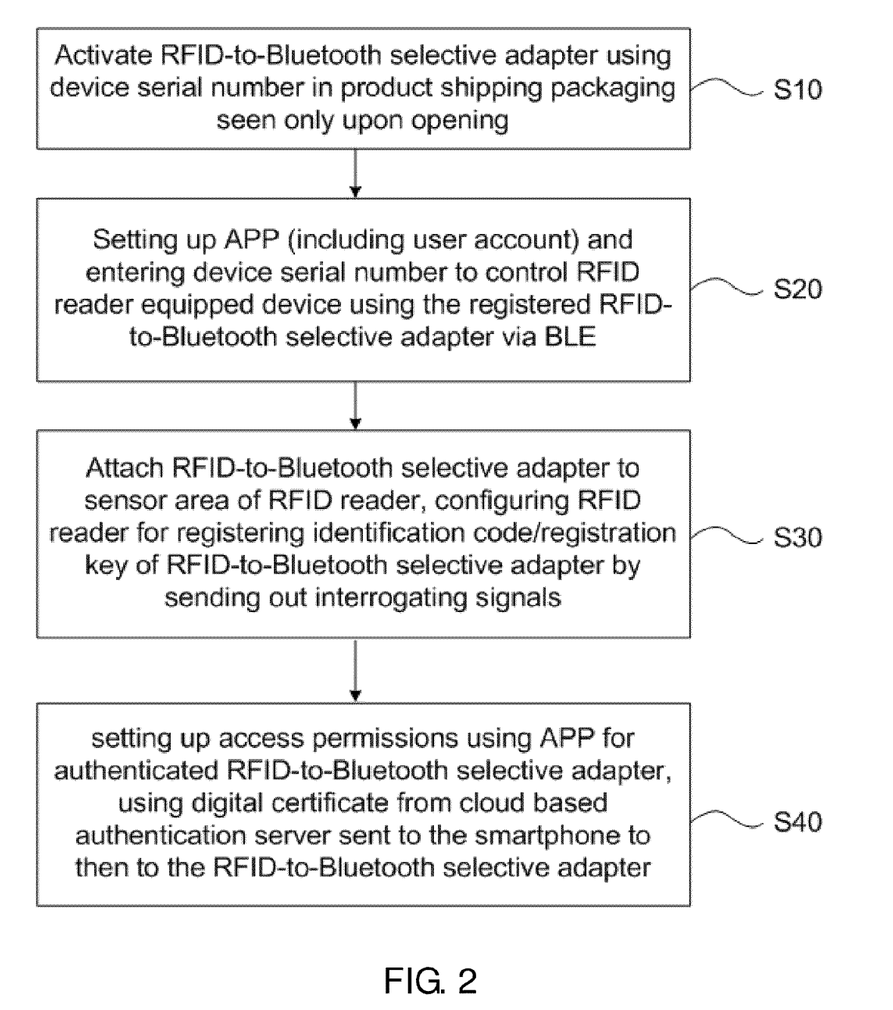
FIG. 2 shows a flow chart of a configuration method for a first time initial configuration of the RFID-to-Bluetooth selective adapter of the first embodiment using an APP.

Referring to FIG. 2, A configuration method of the RFID-to-Bluetooth selective adapter 10 for the first embodiment is described for a first time initial configuration of the RFID-to-Bluetooth selective adapter 10 using an APP to include the following steps:

In Step S10, the RFID-to-Bluetooth selective adapter is activated/turned on, to be entering into a setup mode, in which a product shipping packaging of the RFID-to-Bluetooth selective adapter contains a device serial number therein, which can a string of alphanumeric number or a QR code. The device serial number of the RFID-to-Bluetooth selective adapter can only been seen or read upon opening of the shipping packaging to remove the RFID-to-Bluetooth selective adapter, so that when sealed, the packaged RFID-to-Bluetooth selective adapter would not reveal the device serial number to any bystander.

In Step S20, a user can go to an APP store to download an APP that is configured to provide wireless access management and control of the RFID reader equipped device (an RFID doorlock) using the RFID-to-Bluetooth selective adapter via BLE communications. Upon opening the APP for the first time, an user account is required to be set for the user, and upon successfully setting up the user account on the smartphone, the device serial number is entered to register the RFID-to-Bluetooth selective adapter as an authenticated trusted device in a cloud based authentication server.

In Step S30, the RFID-to-Bluetooth selective adapter is to be directly attached or disposed at close proximity to the sensor area of the RFID reader (for example, on the sensor area of the RFID reader equipped RFID doorlock), and to launch or initiate the RFID reader to enter into a configuration mode for adding a new identification code/registration key of the RFID-to-Bluetooth selective adapter. The RFID reader is to read a signal for a identification code/registration key for the customized RFID transponder of the RFID-to-Bluetooth selective adapter by sending out an interrogating signal to the RFID transponder of the RFID-to-Bluetooth selective adapter so as to perform registering of the identification code/registration key for the RFID-to-Bluetooth selective adapter. The identification code/registration key is a an hexadecimal ID string of 16 bytes In Step S40, the APP is used to set up access rights and permissions for the authenticated RFID-to-Bluetooth selective adapter, the cloud based authentication server can issue a digital certificate which is an encrypted digital file to the smartphone to be transmitted to the RFID-to-Bluetooth selective adapter, or the digital certificate can be issued instead through a third party trusted certificate authority. This digital certificate can be a perpetual certificate or a timed duration certificate.

Figure 3:
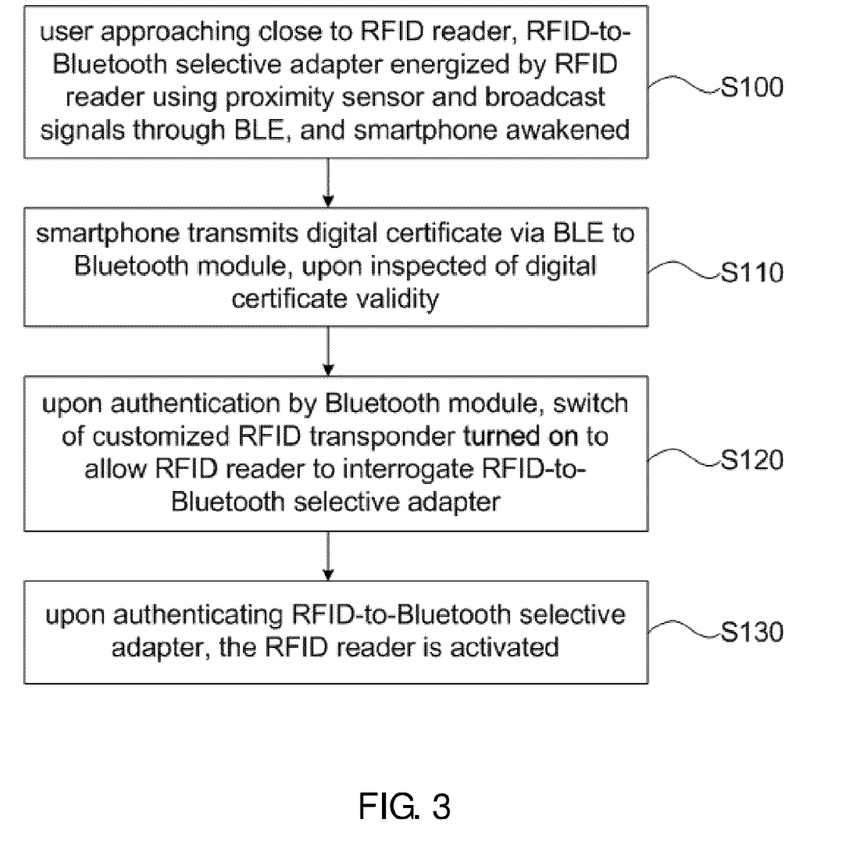
FIG. 3 shows a flow chart of an operating method of the RFID-to-Bluetooth selective adapter of the first embodiment.

Referring to FIG. 3, an operating method of the RFID-to-Bluetooth selective adapter of the first embodiment is described to include the following steps: In Step S100, when the user is approaching close by or at close proximity to the RFID reader equipped device, the RFID-to-Bluetooth selective adapter is energized by the interrogating signals from the RFID reader of the RFID reader equipped device (the RFID reader has an inductor coil which broadcast the interrogating signals) when the RFID reader equipped device through the use of a proximity sensor, or the like, is able to sense the user located at close proximity thereof, which in turn, will allow the RFID-to-Bluetooth selective adapter to broadcast signals through Bluetooth or BLE, and the smartphone (or any wearable electronic device) in Bluetooth/BLE broadcast coverage range would then intercept the broadcast signal to be automatically awakened and activated.

In Step S110, the smartphone (or the wearable electronic device) transmits the digital certificate to the RFID-to-Bluetooth selective adapter via BLE to the Bluetooth module inside therein, the RFID-to-Bluetooth selective adapter is to inspect as to whether the digital certificate is valid or expired or invalid. Without having any authenticated smartphone or wearable mobile device being properly configured by the smart doorlock remote control APP, or in other words, if the user is not using any smartphone or that the smartphone has yet to be installed with the APP, the user can still use a conventional RFID tag or RFID smart card to be placed on or above the sensor area of the RFID reader equipped device for performing proper access control usage (i.e. open or close the door, turn on and turn off the door lock).

In Step S120, upon successful authentication by the Bluetooth module, the switch of the customized RFID transponder inside the RFID-to-Bluetooth selective adapter is turned on by turning on the on/off switch of the customized RFID transponder in the RFID-to-Bluetooth selective adapter, so as allow the RFID reader (of the RFID reader equipped device) to interrogate and read the customized RFID transponder inside the RFID-to-Bluetooth selective adapter.

In Step S130, upon successfully verifying or authenticating the ID string for the customized RFID transponder of the RFID-to-Bluetooth selective adapter, the RFID reader equipped device is activated. The RFID-to-Bluetooth selective adapter can obtain power from an integrated power supply, such as a small battery, or obtain electrical power through energy harvesting using the RFID energy harvesting circuit from the interrogation signals in the form of electromagnetic waves from the RFID reader. For the sake of power conservation, the RFID reader of the RFID reader equipped device would not be operating under continuously sensing mode of nearby EMF signals (typically operating under current of dozens of milliamps, mA), only when the RFID reader is placed in close proximity to the user, would then trigger activation of the RFID reader to perform EMF signal sensing by the RFID reader, in this manner, various sensing methods such as by infrared LED, ultrasonic sensing, microwave sensing, which are low-power sensing methods . . . (requiring current in the tens of microamps, uA) can be used. The energy from the EMF signals of the RFID reader equipped device can be used to power on the RFID-to-Bluetooth selective adapter, so that Bluetooth or BLE communication from the RFID-to-Bluetooth selective adapter can be established with the adjacent smartphone to perform two way communications using the APP providing wireless access management and control of the RFID reader equipped device through the RFID-to-Bluetooth selective adapter downloaded in the smartphone. Under typical operation, the power consumption of the RFID-to-Bluetooth selective adapter is about 5 microamps, or 5 uA.

Figure 4:
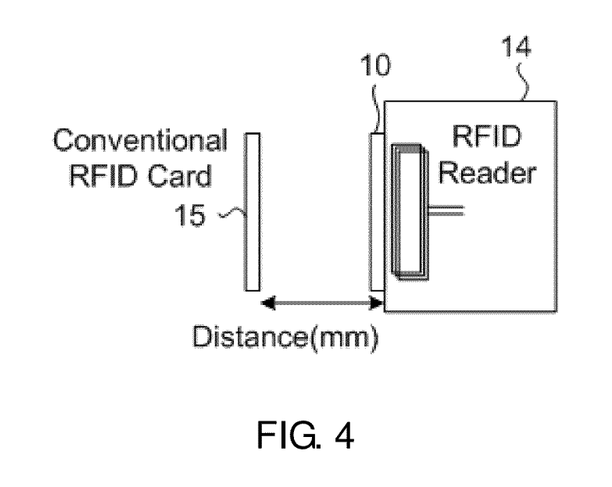
FIG. 4 shows a schematic diagram of a test configuration for determining the effect of having a RFID-Bluetooth selective adapter installed onto a RFID reader, with respect to conventional RFID card also being used alongside.

Upon installation and implementation of an actual prototype for the RFID-bluetooth selective adapter 10 according to the first embodiment, a test is conducted to determine the actual effect of a RFID-bluetooth selective adapter 10 installed onto a RFID reader 14, with respect to operating behavior of a conventional RFID card 15 which is not part of the RFID-bluetooth doorlock system 500 as shown in FIG. 4. In the conducted test, one test configuration named "with adapter" has the RFID-Bluetooth selective adapter 10 installed onto the RFID reader 14 and covering 100% of the sensor area of the RFID reader 14. Meanwhile, another test configuration named "without adapter" has no RFID-Bluetooth selective adapter installed, and thus there is nothing obstructing the open space between the conventional RFID card 15 and the RFID reader 14. The conventional RFID card 15 is then held at a furthest sensing distance (measured in mm) away from the RFID reader 14 in both test configurations of "with adapter" and "without adapter", and followed by performing normal doorlock activation steps. The data is then collected as follow: Please note that thickness of the RFID-to-bluetooth selective adapter 10 is 1 mm in this conducted test.

TABLE 1

| RFID Reader Model No. | Distance(mm) | |
|---|---|---|
| | Without adapter | With adapter |
| Smart Digital Lock 3004RM | 2 | 2 |
| Samsung EZON SHS-1320 | 24 | 22 |

For preventing the customized RFID transponder 12 in the RFID-to-Bluetooth selective adapter 10 from tampering or removal by criminal individuals to be later attaching a separate coil forming a rogue RFID tag, the RFID-to-Bluetooth selective adapter can adopt system-on-chip (SoC) or System-In-Package (SiP) design and device structures to encapsulate the entire circuitry so as to avoid the possibility of being taken apart or disassemble due to reverse engineering efforts.

The RFID-to-Bluetooth selective adapter and the smartphone have encrypted communication under Bluetooth smart technology, having association models, including Just Works, Out of Band and Passkey Entry, multiple key generations for preserving confidentiality of data and device authentication, and device Identity. Encryption in Bluetooth Smart (low energy) technology uses AES-CCM cryptography, and the encryption is performed in the controller. As a result, the initiating packet will be different each time the smartphone is used to perform authentication and activation of the RFID-to-Bluetooth selective adapter. As a result, the overall security and integrity of the system is thus enhanced.

The RFID-to-Bluetooth selective adapter 10 of the first embodiment has reduced barrier to adoption due to the ease and convenience of being easily adapted to existing RFID doorlock systems, and requiring only limited expenditure to cover purchase cost, installation cost and labor. In addition, there is no need to discard the existing RFID doorlock system. Moreover, the physical size of the RFID-to-Bluetooth selective adapter is relatively small in comparison with some of the available Bluetooth smart lock on the market, such as the Kwikset® Kevo deadbolt lock which has a very large interior hardware module that goes on the interior side of the door. Thus, the usage of the RFID-to-Bluetooth selective adapter allows typical home owner or property owner/manager to provision electronic keys securely by internet to any designated or chosen individual(s) under various different access control duration or schemes (i.e. the electronic key can allow for access for just one entry, for multiple entry within one day or specified days, for one month, etc.) so that the hassle of exchanging physical RFID keys are thereby avoided.

Figure 5:
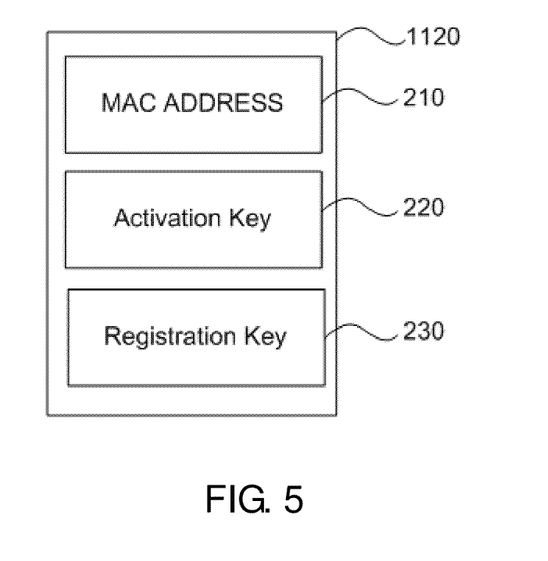
FIG. 5 shows a block diagram of a Bluetooth MAC address, an activation key, and a registration key stored in an EEPROM memory disposed in the Bluetooth module of the RFID-to-Bluetooth selective adapter.

A RFID-to-Bluetooth selective adapter having a more secured system design by adopting a defense in depth approach for the sake of security protection and maintaining integrity for the smart door lock system is disclosed as follow according to a second embodiment of present invention. The second embodiment of the RFID-to-Bluetooth selective adapter includes a Bluetooth module MAC address 210, an activation key 220, and a registration key 230. Referring to FIGS. 5 and 9, the MAC address 210, the activation key 220, and the registration key 230 are securely stored in the EEPROM memory 1120 disposed in the Bluetooth module 11 of the RFID-to-Bluetooth selective adapter 10. The MAC address 210 and the activation key 220 for the RFID-to-Bluetooth selective adapter 10 are kept without being changed (permanent or constant) later on. Meanwhile, the registration key 230 is obtained by the user after registering of the RFID-to-Bluetooth selective adapter 10 using the APP. The MAC Address 210 is a serial number of 6 bytes in length, such as 12:34:56:67:9A:BC, the activation key 220 is a string of 16 bytes. Each device has a unique MAC address and activation key. The cloud based authentication server contains a copy of the MAC address serial number, and the activation key 220.

Figure 6:
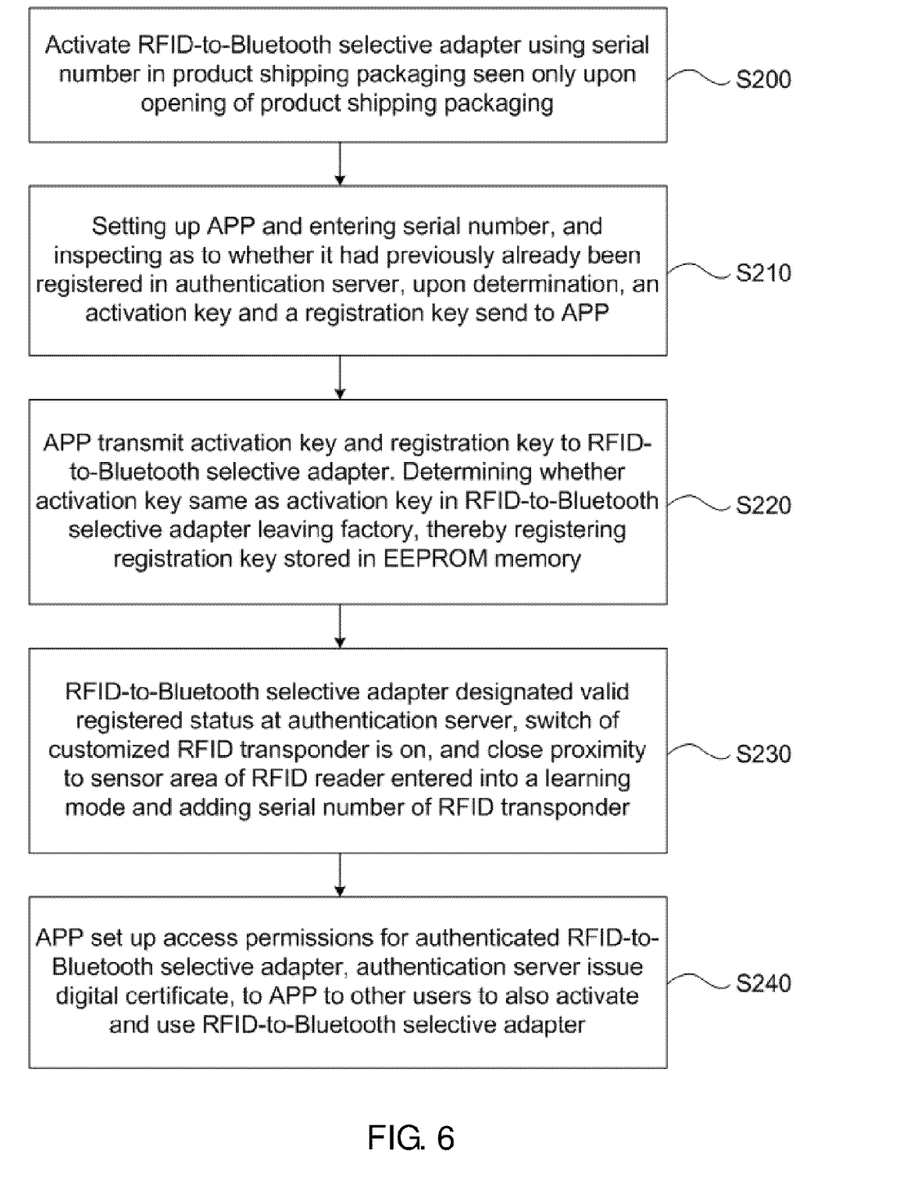
FIG. 6 shows a flow chart of a configuration method of the RFID-to-Bluetooth selective adapter for the second embodiment for a first time initial configuration of the RFID-to-Bluetooth selective adapter using an APP.

Referring to FIG. 6, a configuration method of the RFID-to-Bluetooth selective adapter for the second embodiment is described for an initial configuration of the RFID-to-Bluetooth selective adapter using an APP to include the following steps:

In Step S200, the RFID-to-Bluetooth selective adapter is turned on and activated, to be entering into a setup mode, in which a product shipping packaging of the RFID-to-Bluetooth selective adapter contains an serial number therein. The serial number of the RFID-to-Bluetooth selective adapter can only been seen upon opening of the shipping packaging to remove the RFID-to-Bluetooth selective adapter, so that when sealed such as prior to be purchased or during shipping, the packaged RFID-to-Bluetooth selective adapter would not reveal the serial number to any bystander.

In Step S210, a user can go to an APP store to download an APP that is configured to provide wireless access management and control of the RFID reader equipped device (an RFID doorlock) using the RFID-to-Bluetooth selective adapter via BLE communications. Upon opening the APP for the first time, the smartphone receives communication signals from the RFID-to-Bluetooth selective adapter so as to enter into two way communication with the RFID-to-Bluetooth selective adapter, in which the serial number is entered into a field in a RFID-to-Bluetooth selective adapter setup page in the APP. The serial number is then sent by the APP to the cloud based authentication server for authentication. Upon inspecting as to whether the serial number of the RFID-to-Bluetooth selective adapter had previously already been registered in the cloud based authentication server, the cloud based authentication server then send back an activation key and provisions a registration key (see FIG. 6) to send to the APP in the smartphone.

In Step S220, the APP then transmit the activation key and the registration key from the cloud based authentication server to the RFID-to-Bluetooth selective adapter. Upon inspecting and determining as to whether the activation key from the cloud based authentication server is the same as the activation key in RFID-to-Bluetooth selective adapter (which was originally provided by the manufacturer upon leaving the factory), thereby registering the registration key (see FIG. 5) to the RFID-to-Bluetooth selective adapter to be securely stored in the EEPROM memory disposed in the Bluetooth module.

In Step S230, the RFID-to-Bluetooth selective adapter is being designated as under a valid registered status at the cloud based authentication server, the switch of the customized RFID transponder is on. The RFID-to-Bluetooth selective adapter is to be directly attached or disposed at close proximity to the sensor area of the RFID reader (for example, on the sensor area of the RFID reader equipped RFID doorlock), and to launch the RFID reader to enter into a learning mode for learning and adding a unique serial number of the RFID transponder (such as the identification code of the RFID chip or the registration key in the EEPROM memory of the Bluetooth module), thus completing the training for the RFID reader.

In Step S240, the APP is used to set up access rights and permissions for the authenticated RFID-to-Bluetooth selective adapter, the cloud based authentication server can issue a digital certificate, such as a perpetual certificate or a temporary certificate, to the APP on the smartphone to be transmitted to other users who have also downloaded and setup the APP on their smartphones so as to be able to activate and use the RFID-to-Bluetooth selective adapter.

Figure 7:
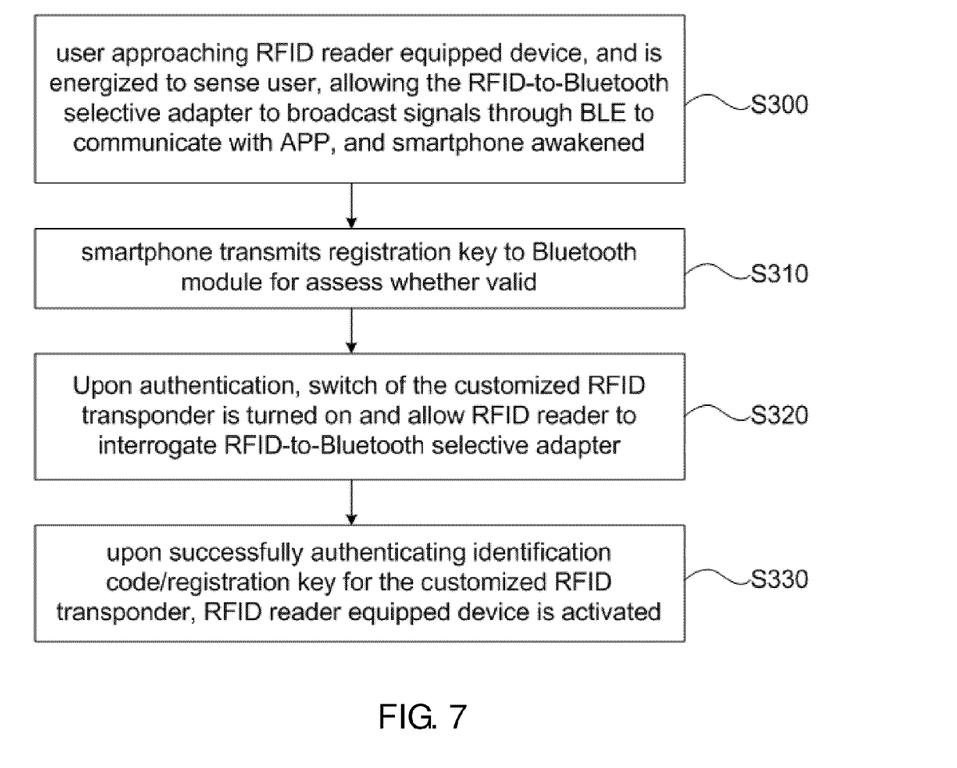
FIG. 7 shows a flow chart of an operating method of the RFID-to-Bluetooth selective adapter of the second embodiment.

Referring to FIG. 7, an operating method of the RFID-to-Bluetooth selective adapter of the second embodiment is described to include the following steps:

In Step S300, when the user is approaching at close proximity to the RFID reader equipped device, the RFID reader of the RFID reader equipped device is energized through the use of a proximity sensor, to sense the user located at close proximity thereof, which in turn, will allow the RFID-to-Bluetooth selective adapter to broadcast signals through BLE, and the smartphone would then be notified to be awakened and activated.

In Step S310, the smartphone transmits the registration key to the RFID-to-Bluetooth selective adapter via BLE to the Bluetooth module inside therein, the RFID-to-Bluetooth selective adapter assesses as to whether the registration key transmitted from the smartphone is valid or expired or invalid by comparing against the copy of stored registration key therein.

In Step S320, upon successful authentication by the Bluetooth module, the switch of the customized RFID transponder inside the RFID-to-Bluetooth selective adapter is turned on by turning on the on/off switch of the customized RFID transponder in the RFID-to-Bluetooth selective adapter, so as allow the RFID reader (of the RFID reader equipped device) to interrogate and read the customized RFID transponder inside the RFID-to-Bluetooth selective adapter.

In Step S330, upon successfully verifying or authenticating the identification code/registration key for the customized RFID transponder of the RFID-to-Bluetooth selective adapter, the RFID reader equipped device is activated.

A low cost and low power consumption one axis or three-axis motion sensor can be included in the customized RFID transponder of the second embodiment, to be used for detecting and sensing whether the 3D orientation thereof has been changed significantly due to outside tampering or complete removal thereof. Since the RFID-to-Bluetooth selective adapter is typically adhered in an vertical orientation with respect to the ground plane, and thus by tabulating and recording the real-time 3D orientation detected by the motion sensor over time, the motion sensor can easily detect abnormal or sudden orientation changes caused by forced removal or disassembly or theft of the RFID-to-Bluetooth selective adapter from the RFID reader equipped device, thus leaving the smart doorlock system. In response to this sudden changes in orientation thereof, the RFID-to-Bluetooth selective adapter can switch to operate in a self-destruct mode, in which both the registration key or the certification data are both wiped clean from an EEPROM memory thereof, so that no one can read the registration key or the certification data that were previously saved. At the same time, the resulting RFID-to-Bluetooth selective adapter with the wiped-clean EEPROM memory would be render disabled and non-functioning. Furthermore, when attempting to manually remove the customized RFID transponder from the RFID-to-Bluetooth selective adapter to make a rogue RFID tag (posing or pretending as an genuine RFID-to-Bluetooth selective adapter) to be read by the RFID reader of the RFID reader equipped device, the adoption of SoC (System-on-chip) or SiP (System-in-Package) packaging configuration for the entire RFID-to-Bluetooth selective adapter, which includes the Bluetooth module, along with the customized RFID transponder, and the on/off switch for the customized RFID transponder to be formed onto one single chip, in combination with using opaque encapsulating adhesive to protect the RFID-to-Bluetooth selective adapter of the second embodiment of present invention so as to achieve improved tampering resistance and prevent reverse engineering efforts by thieves attempting to steal the registration key data. The APP requires to have the registration key that is proper authenticated to be able to perform decryption correctly, thus, the initiation packet broadcasted by the RFID-to-Bluetooth selective adapter during interrogation of the smartphone through BLE communication (for authentication) will be different each time. Thus, even when the communication data between the smartphone and the RFID-to-Bluetooth selective adapter has been intercepted and spoofed by hacker or unauthorized third-party, the encrypted communication data would not likely to be properly decrypted without having the registration key. The APP residing on the smartphone can have the registration key stored therein, thus allowing off-line (without internet access) full communication with the RFID-to-Bluetooth selective adapter.

In order to ensure that no unauthorized individual steal and gaining full access to the smartphone, the APP on the smartphone, in an alternative embodiment, can be configured with an APP access password to be stored on the smartphone, thus each time when the APP is activated for usage, the user needs to input the correct APP access password to gain full access to the range of services offered by the RFID-to-Bluetooth selective adapter.

In the above embodiments, upon realizing the loss or disappearance of the smartphone, a portal website for the APP or the APP residing on another smartphone can be used to perform remote log off for the account on the disappeared smartphone so as to eliminate the possibility of unauthorized person gaining usage of the APP in the disappeared smartphone. Upon activating the APP in the disappeared smartphone, the APP will automatically log off via internet access. In addition, the APP residing on the smartphones are wirelessly connected to the cloud based authentication server via SSL security protocol over internet, for protecting against hackers sniffing and spoofing. Meanwhile, because the RFID-to-Bluetooth selective adapter requires product registration upon product activation during first time usage, and any subsequent unauthorized user would not have access to the original device serial number found in the product shipping packaging of the RFID-to-Bluetooth selective adapter, thus the risk of hijacking of the RFID-to-Bluetooth selective adapter for improper usage is dramatically reduced.

The RFID-to-Bluetooth selective adapter of the embodiments of present invention permits the RFID reader equipped devices to also support Bluetooth input without affect existing RFID operations. A user can use a smartphone or any electronic device with BLE or Bluetooth smart capability to activate (turn on and turn off or open and close) various RFID reader equipped devices, such as RFID smart doorlocks, thereby allowing family members improved ease of entry access to individual homes, and allowing single-entry or time-based entry access by friends, tutors, electricians, plumbers, realtors into homes and various controlled access spaces.

The RFID-to-Bluetooth selective adapter through the usage of an APP configured in the smartphone/BLE equipped device and a cloud based authentication server can thereby provide various different access rights and settings for various users using the RFID smart doorlocks.

In the above embodiments, the RFID-to-Bluetooth selective adapter can be further configured to automatically report back the tabulated historical data for the doorlock activities of the RFID reader equipped device to be stored in an activity log and managed by and viewed on the mobile phone APP.

In another embodiment of present invention, a simplified RFID-to-Bluetooth selective adapter can have just a traditional RFID transponder, an conventional antenna, an on/off switch at the antenna terminal, and a conventional Bluetooth module. The conventional Bluetooth module is specifically configured to turn on and off the on/off switch at the antenna to control whether or not the traditional RFID transponder would be activated and by a RFID reader's communication signals. The components of the simplified RFID-to-Bluetooth selective adapter can be realized on a PCB board.

In yet another embodiment of present invention, an upgraded version of the RFID-to-Bluetooth selective adapter can adopt SoC (System-on-chip) design to combine the Bluetooth module and the customized RFID transponder together onto a single chip, as well as place the Bluetooth module and the RFID antenna printed on a flexible printed circuit board (FPC), with a combined weight less than 5 grams, and as thin as paper (<1 mm in thickness). The upgraded version of RFID-to-Bluetooth selective adapter can be laminated or adhered to the RFID reader (like the way a 3M™ wound dressing tape works above a wound area), thereby becoming less conspicuous and aesthetically more pleasing, as well as being very easy to install. In addition, the APP can also have various security upgrades such as adopting of biometric authentication scanner, advanced password entry, facial recognition, fingerprint authentication, etc.

In the above embodiments, the APP is configured to provide wireless access management and control of the RFID reader equipped device using the RFID-to-Bluetooth selective adapter via BLE communications, and to provide with an user account for the user on the smartphone to register the RFID-to-Bluetooth selective adapter as an authenticated trusted device in a cloud based authentication server. In addition, the APP is used to set up access permissions for the authenticated RFID-to-Bluetooth selective adapter, and transferring the digital certificate issued from the cloud based authentication server to the RFID-to-Bluetooth selective adapter. The user can use the APP to activate or deactivate the RFID reader equipped device using the RFID-to-Bluetooth selective adapter in real-time conveniently with or without internet connection. In a RFID doorlock usage scenario, the user can use the APP to open or close a door with a RFID smart doorlock mounted with a RFID-to-Bluetooth selective adapter in real-time conveniently with or without internet connection.

In the above embodiments, the compatible Bluetooth versions that can be used include Bluetooth, Bluetooth smart, Bluetooth smart ready, and/or other Bluetooth versions also included.

In the above embodiments, the terms "activated" and "activating" can have at least one of the following meanings: (a) for an entity to go from an "on" state to an "off" state when it is currently in an "off" state; or (b) for an entity to go from an "off" state to an "on" state when it is currently in an "on" state; (c) for a circuit to go from a closed circuit to an open circuit when it is currently in closed circuit state; or (d) for a circuit to go from a open circuit to an closed circuit when it is currently in open circuit state. Entity can be any of the component elements of the RFID-to-Bluetooth selective adapter. Circuit can be a circuit of one entity. The terms "activating" and "activate" are different from the terms "initiating" and "initiate", because "activating" and "activate" implies that the entity subsequently may continue on to perform authorized actions, whereas, "initiating" and "initiate" merely implies that the entity has being powered on, without being given any authentication or permissions for performing further actions.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A RFID-to-Bluetooth selective adapter installed to a RFID reader equipped device, the RFID reader equipped device having a RFID reader therein and a sensor area thereon, the RFID-to-Bluetooth selective adapter, comprising:

a customized RFID transponder, comprising:
   an RFID Integrated chip (IC),
   a RFID sensor coil,
   an on/off switch, and
   a RFID energy harvesting circuit;
a Bluetooth module, comprising:
   a Bluetooth Low Energy System-on-Chip (SoC),
   an accelerometer, and
   a EEPROM memory; and
wherein a smartphone or wearable device through Bluetooth communication, performs authentication and management of the RFID-to-Bluetooth selective adapter for activating the customized RFID transponder therein to allow the RFID reader to read a signal from the customized RFID transponder.

2. The RFID-to-Bluetooth selective adapter of claim 1, wherein a smartphone through Bluetooth smart communication, performs authentication, management, and operating functions of the RFID-to-Bluetooth selective adapter for activating the customized RFID transponder therein for one to five seconds to allow the RFID reader to read a signal from the customized RFID transponder.

3. The RFID-to-Bluetooth selective adapter of claim 1, wherein the RFID reader of the RFID reader equipped device authenticates the RFID-to-Bluetooth selective adapter using the customized RFID transponder therein to activate the RFID reader.

4. The RFID-to-Bluetooth selective adapter of claim 1, wherein the customized RFID transponder is directly activated only by the Bluetooth module and not by the RFID reader using an internal wire in the Bluetooth module extending out to connect the on/off switch of the customized RFID transponder for providing the activation.

5. The RFID-to-Bluetooth selective adapter of claim 2, wherein the RFID energy harvesting circuit detects whether the RFID reader is in an interrogating state, and upon determining that the RFID reader is in an interrogating state, the RFID energy harvesting circuit is to awaken the Bluetooth module as to allow the smartphone and the Bluetooth module engage in authentication, and upon authentication thereby activating the customized RFID transponder.

6. The RFID-to-Bluetooth selective adapter of claim 1, wherein the Bluetooth module is operating under Bluetooth, Bluetooth smart, or Bluetooth smart ready protocol.

7. The RFID-to-Bluetooth selective adapter of claim 1, wherein the customized RFID transponder does not interfere with other RFID tags for use with the RFID reader equipped device by having the on/off switch of the customized RFID transponder to remain in an off state.

8. The RFID-to-Bluetooth selective adapter of claim 1, wherein configured of having a self-destruct mode for protecting against outside tampering by deleting a registration key from the EEPROM memory and the identification code from the customized RFID transponder using the accelerometer.

9. The RFID-to-Bluetooth selective adapter of claim 1, wherein installed directly or indirectly on or above a sensor area of the RFID reader equipped device, so as to facilitate the RFID Reader in the RFID reader equipped device to interrogate the RFID-to-Bluetooth selective adapter.

10. The RFID-to-Bluetooth selective adapter of claim 1, wherein the customized RFID transponder is not under an active operating mode, and the RFID reader is reading and interrogating other RFID tags without detriment due to the presence of the RFID-to-Bluetooth selective adapter.

11. The RFID-to-Bluetooth selective adapter of claim 1, wherein the Bluetooth module directly controlling the on/off switch of the customized RFID transponder.

12. The RFID-to-Bluetooth selective adapter of claim 1, wherein when operating the RFID-to-Bluetooth selective adapter under a deactivated state, a RFID sensor coil of the RFID-to-Bluetooth selective adapter is under an open circuit, wherein the RFID reader equipped device is then capable of interrogating other RFID tags.

13. The RFID-to-Bluetooth selective adapter of claim 1, wherein the RFID reader equipped device is a RFID smart card door lock mounted to a door.

14. A RFID-to-Bluetooth selective adapter installed to a RFID reader equipped device, the RFID reader equipped device having a RFID reader therein and a sensor area thereon, the RFID-to-Bluetooth selective adapter, comprising:
   a customized RFID transponder comprising an RFID Integrated chip (IC), a RFID sensor coil, an on/off switch, and a RFID energy harvesting circuit; and
   a Bluetooth module comprising an Bluetooth Low Energy System-on-Chip (SoC), an accelerometer, and a EEPROM memory,
   wherein the EEPROM memory storing a Bluetooth MAC address, an activation key, and a registration key therein, the customized RFID transponder carries the Bluetooth MAC address, the activation key, and the registration key; the Bluetooth MAC address and the activation key are kept without being changed, while the registration key is obtained after registering of the RFID-to-Bluetooth selective adapter using an APP.

15. The RFID-to-Bluetooth selective adapter of claim 14, wherein adopting system-on-chip (SoC) or System-In-Package (SiP) design.

16. The RFID-to-Bluetooth selective adapter of claim 14, wherein the RFID reader equipped device is a RFID door lock.

* * * * *